United States Patent
Maci

[15] 3,670,854
[45] June 20, 1972

[54] BRAKE PUMP AIR VALVE AND COOLING MEANS

[72] Inventor: Raymond J. Maci, Indianapolis, Ind.

[73] Assignee: General Motors Corporation, Detroit, Mich.

[22] Filed: July 6, 1970

[21] Appl. No.: 52,211

[52] U.S. Cl............................188/71.6, 188/72.2, 188/72.6, 188/106 F, 188/264 E
[51] Int. Cl.........................................F16d 65/84
[58] Field of Search....................192/113 B; 188/71.6, 72.2, 188/72.6, 72.9, 264 D, 264 E, 264 P, 106 F

[56] References Cited

UNITED STATES PATENTS

| | | | |
|---|---|---|---|
| 2,912,884 | 11/1959 | Christenson et al. | 74/759 |
| 3,495,404 | 2/1970 | Thompson | 188/264 E |
| 2,956,649 | 8/1960 | Kelley | 188/71.6 x |

Primary Examiner—George E. A. Halvosa
Attorney—W. E. Finken and A. M. Heiter

[57] ABSTRACT

A cross-drive transmission having a multi plate brake on each output shaft and a hydraulic and mechanical actuation and cooling system including a cylinder mounted for a rotary and axial movement on a fixed piston and a cam mechanism therebetween responsive to rotary movement of the cylinder to axially move the cylinder for a brake application. Movement of the brake apply linkage connected to the cylinder rotates the cylinder to cause the cam mechanism to mechanically apply the brake against a first rotary plate which assists rotation of the cylinder for a self energizing brake application. On the supply of fluid to the cylinder chamber, the cylinder engages the first plate and rotation thereof actuates the cam mechanism for self energized brake application. The brake plate cooling system has a pump supplying coolant thereto which has an air vent valve in its intake to discontinue cooling fluid supply when the air valve is open by the brake linkage in the brake off position. When the brake is applied, either hydraulically or mechanically, the linkage is respectively either moved by the self energizing action of the brake or by the manual brake apply movement respectively to close the air valve to provide coolant supply.

7 Claims, 4 Drawing Figures

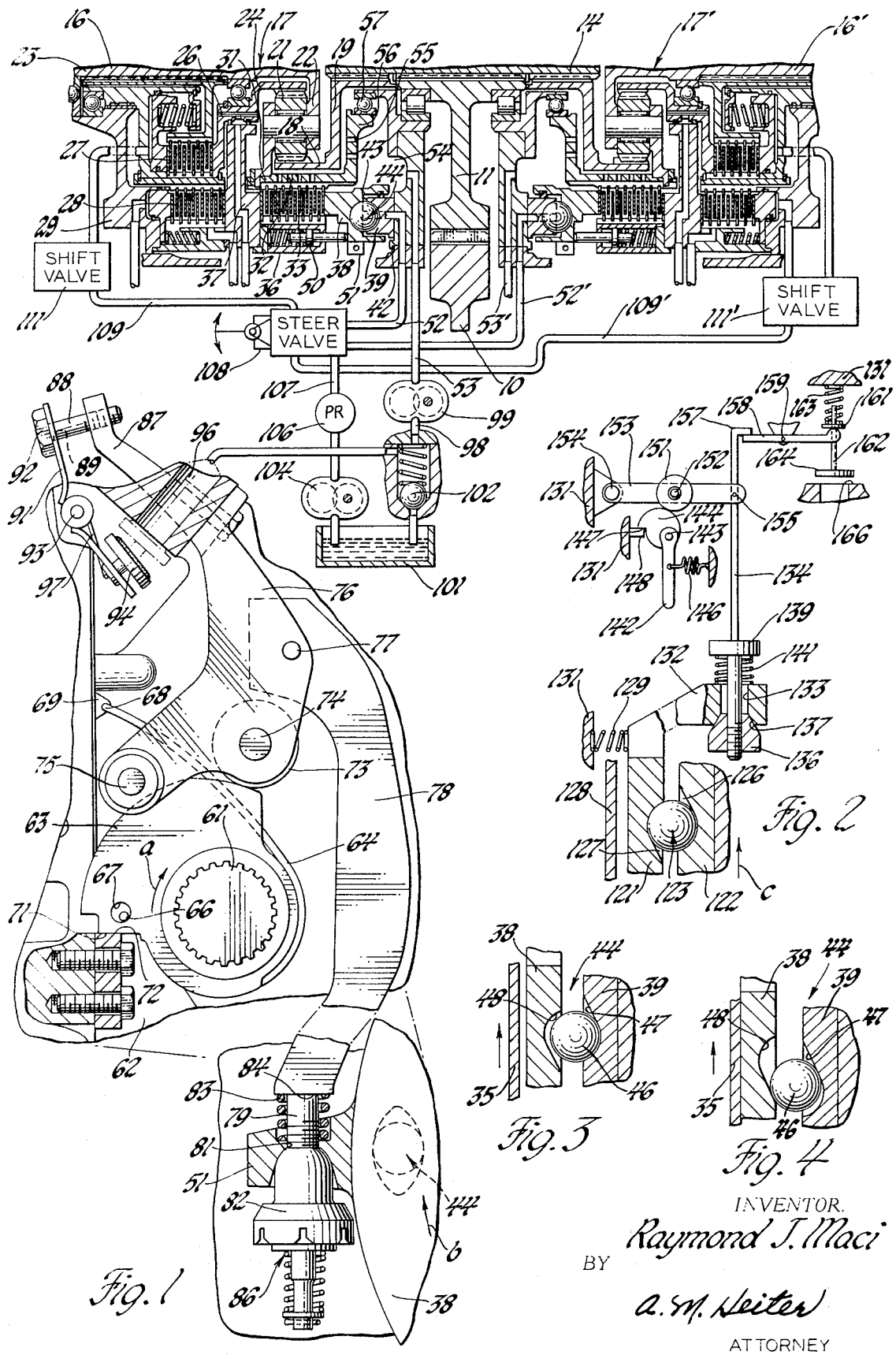

BRAKE PUMP AIR VALVE AND COOLING MEANS

The invention herein described was made in the course of work under contract or subcontract thereunder with the Department of Defense.

This invention relates to dual power output transmissions and particularly brakes having interrelated operating and coolant fluid supply controls.

In dual output transmissions, brakes, having mechanical and hydraulic actuated self energizing apply mechanism are employed. The mechanical application system is generally operated manually for vehicle braking while the hydraulic actuation is controlled by a steering control system for tracked vehicle steering. The cylinder of the brake apply motor engages a rotating brake plate and thus rotates to actuaute the self energizing cam apply mechanism when the brake is either manually or hydraulically applied. The manual apply linkage moves during both manual application and hydraulic application to close an air vent valve during both mechanical or hydraulic brake application so the coolant fluid pump will supply cooling fluid whenever the brake is applied.

An object of the invention is to provide in a brake having mechanical and hydraulic brake apply mechanism which has a member movable during both types of brake apply operation to provide a cooling fluid supply to the brake plates.

Another object of the invention is to provide in a multi plate type brake having a fluid motor for hydraulically applying the brake and a manual brake apply mechanism also operative to apply the brake and acting in response to hydraulically initiated braking to provide a control movement during manual brake application, and hydraulic brake application operative in both modes of operation to close the intake of air vent valve to supply cooling fluid to the brake plates and in the brake released position to open the air vent valve to prevent the supply of cooling fluid to the brake plates.

FIG. 1 diagrammatically shows a dual output transmission having a hydromechanically operated brake and controls therefor.

FIG. 2 shows a modified control arrangement.

FIG. 3 shows the cam self energizing device during hydraulic brake application before contact.

FIG. 4 shows the cam self energizing device during hydraulic brake application after contact.

This invention is an improvement in the controls of the dual output transmission and controls disclosed in the Howard W. Christenson, Raymond J. Maci and Mark E. Fisher U.S. Pat. No. 2,912,884, issued Nov. 17, 1959.

Referring to FIG. 1, herein, the input gear 10 drives the gear 11 and is splined to and drives the cross-drive shaft 14 which drives both the right drive unit 16' and the left drive unit 16. Since these units are similar only the left drive unit is described below and the same description with primed numbers applies to the right drive unit.

The left drive unit 16 has a planetary gear set 17, having a ring gear 18 driven by the cross shaft 14 through a disc 19 and planetary pinions 21 mounted on a carrier 22 connected to drive the output shaft 23 and a sun gear 24. The sungear is connected by a sleeve and drum member 26 to the fluid actuated clutch 27 for connection to the output shaft 23 for direct or 1:1 drive or by the brake 28 to a stationary housing portion 29 for reduction drive as described in detail in the above U.S. Pat. No. 2,912,884. The carrier 22 drivingly and rotatably supports the cylindrical brake drum 31 having apertures 32 for the passage of cooling fluid therethrough. The friction brake has a pack of annular brake plates 33 with alternate plates splined to the drum 31 and intermediate plates splined to the fixed housing 36. The pack of plates is located between a fixed abutment portion 37 of the housing and an annular apply cylinder 38 rotatably and axially movably mounted on an annular piston 39 fixed by suitable screws (not shown) between the cam mechanism 44 on the fixed housing portion 42. The cylinder and piston have suitable seals between their side cylindrical surfaces so they define a sealed expansible fluid chamber 43 therebetween for hydraulically actuating the cylinder. The piston and cylinder have on adjacent facing surfaces a cam actuating mechanism 44, shown in detail in FIGS. 3 and 4. This self energizing cam actuating mechanism 44 has a ball 46 located between oppositely directed or sloped cam surfaces 47 and 48 located respectively on the fixed piston 39 and the movable cylinder 38. On relative rotary movement of the cylinder relative to the piston, this cam mechanism separates the piston and cylinder or axially moves the cylinder for self energizing brake application as illustrated in FIG. 4.

The retraction spring and pin 50 is mounted in a bore in the housing and the spring biased pin engages the cylinder 38 to normally hold the cylinder in the brake disengaged position shown. The mechanical brake apply lug 51 is attached to and projects radially from the cylinder 38, as illustrated in FIG. 1. Brake apply line 52 is connected through the fixed piston between the cam mechanisms 44 to the chamber 43 to hydraulically apply the brake. Cooling fluid supply line 53 is connected through the housing portion 42 to the space 54 between housing 42 and brake drum 31. FLuid flows directly to the plates and through apertures 55 in radial flange 56 which supports the brake drum on bearing 57. Then the cooling fluid flows through apertures 32 in brake drum 31 to the brake plates 33.

The brake controls, illustrated in FIG. 1, have a brake apply shaft 61 rotatably mounted in the fixed support 62 and movable by a conventional brake pedal or lever connected thereto. The brake cam 63 is splined to shaft 61. The coil type retraction spring 64 is wrapped around the shaft and has one offset end 66 set in hole 67 in cam 63 and the other offset end 68 fitting in a hole 69 in the fixed support. The spring 64 biases the cam so the cam abutment 71 engages the fixed abutment 72 on the fixed support to position the cam in the brake off position. Rotation of shaft 61 in the direction of arrow a, the brake apply direction, rotates the cam 63 in the same direction. The cam engages the cam follower or roller 73 rotatably fixed by pin 74 centrally of the length of lever 76 which is pivoted to the support by pivot 75. Lever 76 is connected by pivot pin 77 to the brake apply link 78 which has a threaded portion 79 passing through the aperture 81 in the lug 51. An abutment member 82 secured to the threaded portion 79 rotates the brake cylinder 38 in the direction of the arrow b on brake apply movement of the linkage. Abutment 82 and aperture 81 of lug 51 have spherical engaging surfaces for limited universal movement. The spring 83 between the lug 51 and a shoulder 84 on the link 78 will cause movement of the link 78 with the lug 51 during hydraulic brake application which causes rotation of the cylinder 38 during forward drive due to the self energizing action. This causes the link 78 to rotate lever 76 counter-clockwise. A spring loaded locking device 86 having a spring biasing a non-rotatably mounted washer having projections engaging in the abutment to prevent the abutment 82 turning on the threaded portion 79 but to permit easy release for adjustment.

Thus, the lever 76 rotates counter-clockwise about pivot 75 during mechanical and hydraulic brake actuation. When the brake mechanism is in the brake disengaged position, as shown in FIG. 1, the extension 87 of lever 76 has an actuating screw portion 88 which passes through slot 89 in lever 91 and has a head 92 which engages lever 91 pivoted on the support by pivot pin 93 and lifting the valve member 94 to open the air vent passage 96. A coil spring 97 located around pin 93 has one end engaging the support and the other end engaging the lever to normally bias the air valve 94 closed. During both mechanical and hydraulic brake application the lever 76 moves counter-clockwise moving the adjustable screw portion thereof 88 to permit movement of the lever 91 by the spring 97 to move the air valve from the open position shown to the closed position shown in dotted lines closing the air vent line 96 connected to the pump intake line 98 of the coolant pump 99. The coolant pump 99 is continuously driven by a suitable transmission element such as the cross drive shaft 14 and, when the air valve 94 is closed, draws fluid from the sump 101 through the foot check valve 102 and intake line 98 and supplies it to the coolant line 53 which supplies coolant to the brake as explained above whenever the brake is applied. When the brake is released, the air valve 94 is opened connecting the intake line 98 by line 96 to atmosphere. Thus the pump is unloaded and does not supply cooling fluid.

The hydraulic brake apply system has a sump 101 and an input driven or cross-drive shaft driven pump 104 which supplies fluid to a pressure regulator valve 106 to provide a regulated pressure in the line 107 which is controlled by a suitable steer valve 108. The steer valve 108 normally, for straight drive, supplies fluid via lines 109 and 109' to shift valves 111 and 111' to engage the left and right clutches 27 and 27' for 1:1 drive or the left and right reaction brakes 28 and 28' for reduction drive. Movement of the steer valve for left steer vents line 109 to disengage the effective drive and supply line 52 to engage output brake 33. Movement of the steer valve for right steer similarly controls the right unit. The details of this steer valve and shift valves of this control system are shown in the above U.S. Pat. No. 2,912,884. Thus the steer valve during left steering has a brake apply function and controls the supply of fluid to line 52 which supplies fluid to chamber 43 to hydraulically apply the brake.

When the steer valve 108 is employed to hydraulically apply the brake 33 by supplying fluid by line 52 under pressure to chamber 43, the cylinder 38 engages the first rotating brake plate. This causes, during forward movement when the rotating brake plates move in the direction of arrow b, rotation of the cylinder 38 in the same direction and actuation of the cam apply mechanism 4 to provide hydraulic self energized brake actuation. Since the cylinder 38 is connected through the lug 51 and spring 83 to the link 78, the rotation of the cylinder 38 rotates lever 76 counter-clockwise and causes the air valve 94 to be closed by spring 97 so that the pump 99 supplies cooling fluid via line 53 to the brake plates for cooling. When the brake is mechanically applied, rotation of the shaft 61 and the cam 63 causes counter-clockwise rotation of lever 76 to cause the air valve 94 to close and similarly pump 99 will supply cooling fluid to the brake plates.

A duplicate (not shown) of the foot valve 102 and pump 99 supplies cooling fluid to cooling line 53'. A duplicate linkage and air valve controls the right cooling supply and right brake cylinder in the same way as in U.S. Pat. No. 2,912,884.

The modified linkage shown in FIG. 2 similarly operates a piston 121 mounted on a piston 122 and having a ball cam device 123 therebetween like the cylinder 38, piston 39 and cam device 44. The cam device 123 in FIG. 2 is shown with the balls in the deepest part of the cams 126 127, the disengaged position and spaced from the first rotating brake plate 128 by the retraction spring129 mounted on a fixed housing portion 131. Cylinder 121 has a lug 132 with an aperture 133 receiving the rod 134. Abutment 136 is fixed on the rod and has a universal pivot connection with the lug provided by the engaging spherical surface portions 137 on the abutment and lug. Shoulder 139 is fixed on the rod and spring 141 is located between the shoulder and the lug.

The apply lever 142 is fixed to a shaft 143 rotatably mounted in the housing. The cam is fixed to the shaft and is biased to the release position by return spring 146 which positions cam 144 in the brake release position with its stop portion 147 engaging stop 148 on the housing. The cam 144 engages the roller 151 rotatably mounted by pin 152 fixed on the central portion of lever 153. The lever is pivoted by pivot 154 to the fixed housing 131 and by pivot 155 to the rod 134.

The rod 134 extends beyond lever 153 and has a terminal arm 157 which engages one end of lever 158 which is pivoted by pin 159 on the housing 131 and has a bifurcated actuator end engaging shoulder 161 fixed on stem 162 holding spring 163 compressed and valve 164 open or lifted off its seat 166.

The modified linkage shown in FIG. 2 similarly functions. For manual brake application the lever 142 is rotated clockwise to rotate cam 144 in the same direction. The cam rotates lever 153 counter-clockwise and pulls rod 134 and rotates piston 121 in the direction of arrow c. Then the ball cam mechanism 123 applies the brake. When rotating plate 128 is rotating in the forward direction the same as arrow c, there is self energized brake application. Similarly when fluid under pressure is supplied to the cylinder, it engages plate 128 and during forward drive there is self energized brake application. During both manual and hydraulic brake application the rod 134 moves in the direction of arrow c and moves arm 157 away from lever 158 permitting spring 163 to close valve 164 on seat 166. This actuates a cooling fluid pump system as shown in FIG. 1 to supply cooling fluid to the brake during both mechanical and hydraulic actuation. FIG. 3 shows the cylinder 38 only partially moved axially by oil pressure. Then the cam mechanism 44 is in the brake disengaged position with ball 46 in the deep portions of cams 47 and 48 and cylinder 38 spaced from the adjacent rotating brake plate 35. FIG. 4 shows the cylinder 38 completely moved axially by the oil pressure. Upon contact of cylinder 38 with plate 35 moving in direction of the arrow, the plate moves or rotates the cylinder to cause contact of ball 46 on cams 47 and 48, thereby creating some self-energizing brake application. The air valve is thus caused to be closed and thus initiates cooling by the movement of cylinder 38 prior to contact of the balls with the cams of the cam mechanism and the resultant self energizing brake application, the high energy brake application.

It will be appreciated that the above disclosed specific embodiments are illustrative of the invention and that other modifications may be made.

I claim

1. In a brake; a fixed housing; a drum mounted for rotation on said housing; a plurality of annular brake plates alternately splined to said drum and said housing; fluid motor means having a piston mounted on said housing, a cylinder rotatably mounted on said piston defining a chamber, cam means between said cylinder and housing responsive to rotation of said cylinder relative to said piston to move said cylinder to engage said brake plates and operative on the supply of fluid to said chamber to move to engage a brake plate splined to said drum to rotate said cylinder to actuate said cam means for self energizing hydraulic engagement of said brake plates for brake application; cooling means including a pump having an intake vent supplying cooling fluid to said brake plates and an air valve operative in open position to open the vent to discontinue the cooling fluid supply and in closed position to close the vent to provide the cooling fluid supply and lever means connected to said cylinder and said air valve and movable to rotate said cylinder for mechanical self energizing engagement of said plates for brake application and movable in response to said rotation of said cylinder during both mechanical and hydraulic brake application to close said air valve to provide cooling fluid supply during both movements of said lever means.

2. In a brake; a fixed housing; a rotary element mounted for rotation on said housing; a plurality of brake members, one brake member mounted on said element and another brake member mounted on said housing for relative rotary and relative engaging movement; fluid motor means having one portion mounted on said housing, another portion mounted on said one portion for apply movement and engaging movement to engage said one brake member and said portions defining a chamber therebetween, cam means between said portions responsive to relative apply movement of said portions to move said another portion in engaging movement to engage said one brake member for self energized additional apply movement to engage said brake members and operative on the supply of fluid to said chamber to provide engaging movement of said another portion to engage said one brake member to engage said brake members to provide self energized apply movement of said another portion to actuate said cam means for self energizing hydraulic mechanical engagement of said brake members for brake application, cooling means operative in one position to discontinue the cooling fluid supply and in another position to provide the cooling fluid supply to said brake members; a brake apply actuator to provide a mechanical brake apply force and lever means connected to said brake apply actuator, said cooling means and said another portion for movement by said brake apply actuator to cause said apply movement of said another portion for mechanical self energizing engaging movement of said brake members for mechanical brake application and for movement by said another portion in response to apply movement of said another portion during hydraulic mechanical brake application and responsive to both movements during both mechanical and hydraulic brake application operative to position said cooling means in said another position to provide cooling fluid supply during both mechanical and hydraulic brake application.

3. In a brake; a fixed housing; a drum mounted for rotation on said housing; a plurality of annular brake plates including a rotary plate splined to said drum and a fixed plate splined to said housing; annular fluid motor means having an annular piston mounted on said housing, an annular cylinder mounted on said piston for rotary movement and axial movement for engaging a rotary plate and defining a chamber therebetween operative on the supply of fluid to said chamber to axially move said cylinder to engage said rotary plate to rotate said cylinder, cam means between said cylinder and piston responsive to rotation of said cylinder relative to said piston to provide axial self energizing movement of said cylinder to engage said brake plates; cooling means including a pump having an intake passage having an air vent for supplying cooling fluid to said brake plates and an air valve operative in open position to open said vent to atmosphere to discontinue the cooling fluid supply and having a spring biasing said valve to closed position to close said air vent to provide the cooling fluid supply; a brake apply actuator operative to provide a mechanical brake apply force; a brake apply hydraulic actuator operative to supply fluid to said chamber to axially move said cylinder to engage said rotary plate to rotate said cylinder to actuate said cam means for hydraulic self energizing brake engagement; and lever means connected to said cylinder, said mechanical actuator and said air valve and operative in a normal brake disengaged position to move said air valve against said spring to open said air valve and for movement by said mechanical actuator from said normal brake disengaged position to a brake apply position to transmit said mechanical brake apply force to said cylinder to rotate said cylinder to actuate said cam means for mechanical self energizing engagement of said plates for brake application and for movement from said normal brake disengaged position to a brake apply position in response to said rotation of said cylinder during hydraulic brake application and operative to permit closing of said air valve by said spring to provide cooling fluid supply during both said movement by said mechanical actuator during mechanical brake actuation and said movement of said lever means by said cylinder during hydraulic brake actuation for cooling during both hydraulic and mechanical brake application.

4. In a brake; a fixed housing; a drum mounted for rotation on said housing; a plurality of annular brake plates alternately splined to said drum and said housing; annular fluid motor means having an annular piston mounted on said housing, an annular cylinder mounted for rotary and axial movement on said piston and defining a chamber, cam means between said cylinder and piston responsive to rotation of said cylinder relative to said piston to axially move said cylinder to engage said brake plates and operative on the supply of fluid to said chamber to axially move said cylinder to engage a brake plate splined to said drum to rotate said cylinder to actuate said cam means to further axially move said cylinder for self energizing hydraulic engagement of said brake plates for brake application; cooling means including a pump having an intake passage having a vent and supplying cooling fluid to said brake plates and an air valve operative in open position to open said vent to atmosphere to discontinue the cooling fluid supply and in closed position to close said vent to provide the cooling fluid supply and lever means connected to said cylinder and air valve and operative in a normal brake disengaged position to open said air valve and movable to rotate said cylinder for mechanical self energizing engagement of said plates for brake application and movable in response to rotation of said cylinder during both hydraulic and mechanical brake application to close said air valve to provide cooling fluid supply during both movements of said lever means for both hydraulic and mechanical brake application.

5. The invention defined in claim 4 and said air valve being spring biased to closed position, said lever means in said normal brake disengaged position holding said air valve open and operative on movement during hydraulic and mechanical brake engagement to permit said spring to close said air valve.

6. The invention defined in claim 4 and said lever means including a pivoted lever, an actuator cam rotating said pivoted lever, a link connecting said pivoted lever to said cylinder and said pivoted lever actuating said air valve.

7. The invention defined in claim 4 and said air valve being spring biased to said closed position, said lever means being connected to said cylinder to positively rotate said cylinder in response to lever movement and through a spring to move said lever in response to rotation of said cylinder and a lost motion connection to said air valve to limit closing load on said air valve.

* * * * *